May 17, 1927.
W. MINIER
YIELDABLE COUPLING
Filed March 30, 1926
1,629,041
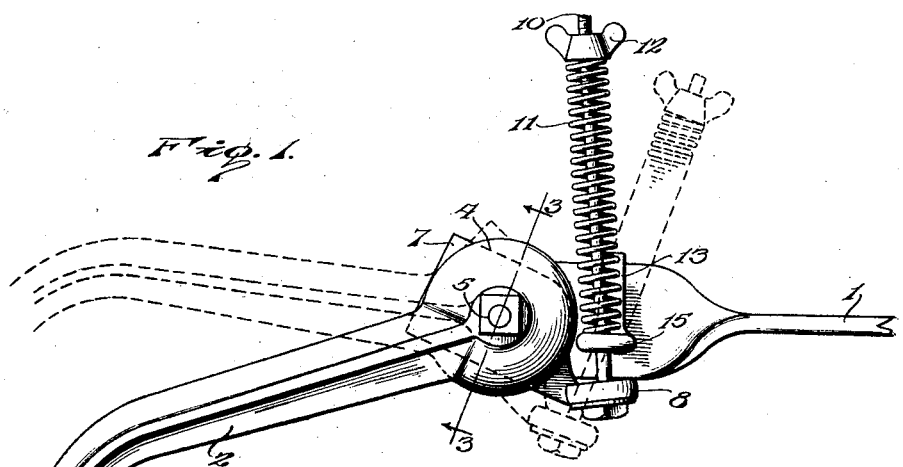
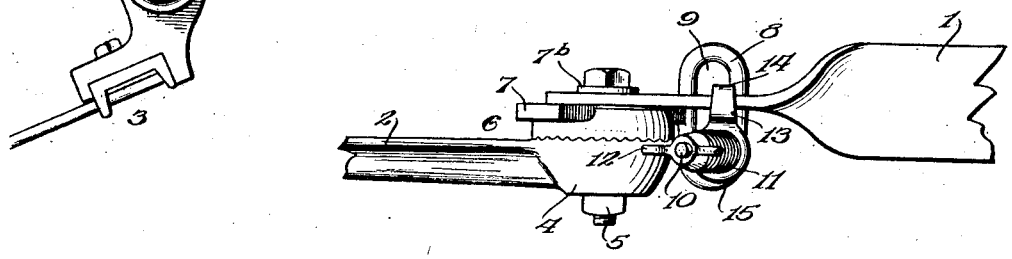
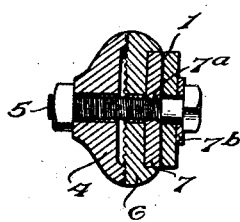
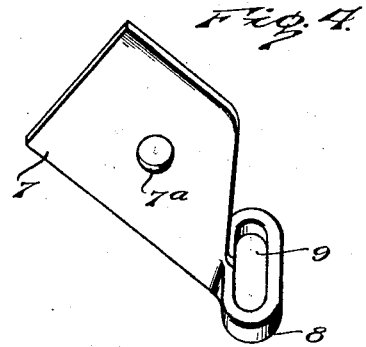
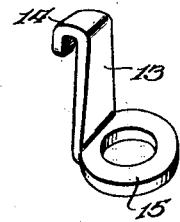
Inventor
W. Minier
By Lacey & Lacey, Attorneys Patented May 17, 1927.

1,629,041

UNITED STATES PATENT OFFICE.

WILLIAM MINIER, OF MILO TOWNSHIP, BUREAU COUNTY, ILLINOIS.

YIELDABLE COUPLING.

Application filed March 30, 1926. Serial No. 98,578.

While the invention provides a connection for general use in coupling parts of agricultural implements it is primarily intended as a self adjusting rake attachment for surface cultivators.

In an implement of the surface cultivator type, the rakes are located in the rear of the blades and are carried by springs which usually are stiff and operate to hold the blades out of the ground when the implement is crossing a ravine or dead furrow. This results in throwing the weight of the blades and the arch of the implement on the rake spring which is either broken or bent and thrown out of adjustment.

The present invention provides a yieldable connection between the rake arm and the spring which admits of the rake yielding, so that the blades always run in the ground and in adjustment. The connection is adjustable and may be set to permit the rake to yield under any predetermined pressure.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof reference is to be had to the following description and the drawings hereto attached, in which—

Figure 1 is a side view of a yieldable connection embodying the invention, the full lines showing the normal position of the parts and the dotted lines an adjusted position when the rake or like part moves upwardly.

Figure 2 is a top plan view of the coupling,

Figure 3 is a detail sectional view on the line 3—3 of Figure 1.

Figure 4 is a detail perspective view of the abutment member for the bolt, and

Figure 5 is a perspective view of the seat member for the spring.

Corresponding and like parts are referred to in the following description and designated in the several views of the drawings by like reference characters.

The numeral 1 designates the rake carrying spring of a surface cultivator, and 2 is the arm to which the rake 3 is attached. The arm 2 terminates at its forward end in a flat, circular head 4 in which is formed a transverse opening to receive a bolt 5. A washer 6 corresponding to the head 4 is mounted upon the bolt 5 and the contiguous faces of the parts 4 and 6 are toothed to prevent displacement when said parts are drawn together into close contact by the bolt 5. An abutment member is mounted upon the bolt 5 and comprises a shank 7 and a cross head 8. The outer side of the washer 6 is recessed to receive the shank 7, thereby preventing independent movement of the abutment member and washer and causing both to move together with the arm 2 and the bolt 5. It is observed that the bolt 5 is free to move in the spring 1, or like part, whereas the parts 4, 6 and 7 move together because of their interlocking. The cross head 8 underlaps the rear end of the spring 1 and is slotted, as indicated at 9, to receive a bolt 10. The cross head 8 projects beyond opposites of the shank 7 and as a result the parts are adapted for a right hand, or a left hand coupling.

An open coil spring 11 is mounted upon the bolt 10 and exerts a pressure to normally hold the rake upon the ground, but which yields to prevent lifting of the cultivator blades out of the ground when the implement is crossing a ravine, dead furrow, or other depression. A thumb-nut 12 mounted upon the upper threaded end of the bolt 10 provides for regulating the tension of the spring 11 which may be set to admit of the coupling yielding at any predetermined pressure or strain. The lower end of the spring 11 engages a seat member which sustains the lower end thrust. The seat member comprises a shank 13, a hook 14 at the upper end of the shank 13 to engage over the upper edge of the spring 1 and an offstanding seat 15 which is apertured to receive the bolt 10.

When the parts are assembled they appear substantially as shown in the drawings. The cross head 8 of the bolt abutment member engages the lower edge of the lower portion of the spring 1 and the seat member for the spring is placed against a side of the spring 1 with the hook 14 engaging over the upper edge of the spring 1 and the seat 15 projecting laterally. The bolt 10 passes through the cross head 8 and seat 15 and receives the spring 11 which is confined between the thumb nut 12 and seat 15, thereby exerting an upward pull upon the cross head 8, whereby to hold the rear end of the arm 2 and the rake 3 carried thereby in contact with the ground. The tension of the spring 11 may be regulated so that the rear end of the arm 2 will yield and admit of the cultivator blades remaining in the ground and in adjustment, without imposing any undue strain upon the spring 1 which would tend to break or bend and throw the same out of adjustment.

The opening 7ª provided in the shank 7 of the abutment member to receive the bolt 5 is threaded to make screw-thread connection with the bolt as shown most clearly in Figure 3. This admits of the spring 1 being loosely clamped between the head of the bolt 5 and the shank 7 of the abutment member, whereby the bolt 5 and the parts 2, 6 and 7 carried thereby may have a free movement. A washer 7ᵇ is mounted upon the bolt 5 between its head and the spring 1. The washer 6 and head 4 of the arm 2 are clamped between the part 7 and the nut of the bolt so as to turn with the latter in the spring 1.

Having thus described the invention, I claim:

1. In combination with parts to be yieldably connected, and a bolt pivotally connecting said parts, an abutment member mounted on said bolt and connected with one of the members to move therewith and adapted to normally engage the other member, a seat carried by the last mentioned member, a bolt passing freely through said seat and engaging the abutment member, an open spring mounted upon said seat and surrounding the bolt and a nut on the bolt for holding the spring on its seat and regulating the tension thereof.

2. In combination with parts to be yieldably connected, and a bolt pivotally connecting said parts, of an abutment member connected to and movable with one of said parts and having a cross head to normally engage the other part. a seat carried by the last mentioned part, a bolt passing loosely through the seat and engaging the said cross head, an open spring mounted upon the bolt and engaging the said seat and a nut on the bolt for regulating the tension of the spring and holding it upon the seat.

3. The combination with parts to be yieldably connected and a bolt pivotally connecting the parts, of an abutment member connected with one of said parts to move therewith and having a slotted cross head normally engaging the other part, a seat carried by the last mentioned part, a bolt passing through the slot of said cross head and through the said seat, an open coil spring mounted upon the bolt and engaging the said seat and a nut threaded on the bolt for regulating the tension of the spring and holding it upon the seat.

4. The combination with parts to be yieldably connected, and a bolt pivotally connecting said parts, of an abutment member connected with one of the parts to move therewith and normally engaging the other part, a member comprising a shank having a hook at one end to engage over the last mentioned part and provided with an offstanding seat, a bolt engaging the abutment member and passing loosely through said seat and a spring coacting with said bolt and seat to hold the parts in normal position.

5. The combination with parts to be yieldably connected and a bolt pivotally connecting the parts, a washer mounted upon the bolt and having interlocking engagement with one of the parts, an abutment member mounted upon the bolt and seated in the outer side of said washer to move therewith, a seat carried by the other part, a bolt engaging the abutment member and passing loosely through said seat and a spring coacting with the seat and bolt to normally hold the parts in a given position.

6. In combination with parts to be yieldably connected and a bolt pivotally connecting said parts, of a washer mounted upon the bolt and having interlocking engagement with one of the parts, an abutment member seated in said washer and having a slotted cross head engaging the other part, a member having a hook to engage the last mentioned parts and provided with an offstanding seat, a bolt passing loosely through the slotted cross head and through the said seat, an open spring mounted upon the bolt and a nut threaded upon the bolt for regulating the tension of the spring and holding it upon the seat.

In testimony whereof I affix my signature.

WILLIAM MINIER. [L. S.]